(12) United States Patent
Sinclair (10) Patent No.: US 12,492,004 B2
(45) Date of Patent: Dec. 9, 2025

(54) REDUCTION OF ASYMMETRICAL LOADING IN PARACHUTE INFLATION

(71) Applicant: Blue Origin Manufacturing, LLC, Huntsville, AL (US)

(72) Inventor: Robert James Sinclair, Costa Mesa, CA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 0 days.

(21) Appl. No.: 18/393,321

(22) Filed: Dec. 21, 2023

(65) Prior Publication Data

US 2025/0178738 A1 Jun. 5, 2025

Related U.S. Application Data

(60) Provisional application No. 63/439,741, filed on Jan. 18, 2023.

(51) Int. Cl.
*B64D 17/22* (2006.01)
*B64D 17/62* (2006.01)
*B64G 1/62* (2006.01)

(52) U.S. Cl.
CPC ............ *B64D 17/22* (2013.01); *B64D 17/62* (2013.01); *B64G 1/623* (2023.08)

(58) Field of Classification Search
CPC ................................. B64D 17/02; B64D 17/10
See application file for complete search history.

(56) References Cited

U.S. PATENT DOCUMENTS

| | | | | |
|---|---|---|---|---|
| 2,419,829 A | * | 4/1947 | Fraim | B64D 17/02 28/143 |
| 2,511,263 A | * | 6/1950 | Hiscock | B64D 17/00 244/145 |
| 2,730,315 A | * | 1/1956 | Fogal | B64D 17/00 244/145 |
| 2,952,429 A | * | 9/1960 | Kostelezky | B64D 17/02 244/145 |
| 2,974,913 A | * | 3/1961 | Augustus | B64D 17/18 244/113 |

(Continued)

OTHER PUBLICATIONS

Knacke, Theo. Parachute Recovery Systems Design Manual. NWC-TP-6575. pp. Title page, 6.42-6.43, 6.73-6.74, 6.124, 7.32-7.34. (Year: 1991).*

(Continued)

*Primary Examiner* — Joshua J Michener
*Assistant Examiner* — Michael B. Kreiner
(74) *Attorney, Agent, or Firm* — Hogan Lovells US LLP (57) ABSTRACT

Systems and methods for a parachute or parachute system are described. The parachute or parachute system includes two or more panels and includes at least one band which may be in a lateral direction relative to the two or more panels. The at least one band may be secured at different points which are lateral mid-points in individual contiguous ones of the two or more panels. Further, a first distance between an individual set of points of the different points may be shorter than twice a second distance. The second distance is a lateral distance from at least one point of the individual set of points to a seam of one panel of the two or more panels having the at least one point.

14 Claims, 8 Drawing Sheets

(56) References Cited

U.S. PATENT DOCUMENTS

| | | | | |
|---|---|---|---|---|
| 3,240,451 | A * | 3/1966 | Sepp, Jr. | B64D 17/02 |
| | | | | 244/145 |
| 3,393,885 | A * | 7/1968 | Neumark | B64D 17/52 |
| | | | | 244/152 |
| 6,454,213 | B1 * | 9/2002 | Watkins | B64D 17/10 |
| | | | | 244/145 |
| 10,689,123 | B2 * | 6/2020 | Fox, Jr. | B64D 1/12 |
| 2024/0076045 | A1 * | 3/2024 | Benjamin | B64D 17/386 |

OTHER PUBLICATIONS

Earth Landing (1993) (6 pages).
Ewing, Edgar G., *Ringsail Parachute Design* (Jan. 1972) National Technical Information Service (380 pp).
Maydew, R.C. and Peterson, C.W., *Design and Testing of High-Performance Parachutes* (Nov. 1991) Advisory Group for Aerospace research and Development (308 pp).

* cited by examiner

REDUCTION OF ASYMMETRICAL LOADING IN PARACHUTE INFLATION

INCORPORATION BY REFERENCE TO RELATED APPLICATION(S)

Any and all applications for which a foreign or domestic priority claim is identified in the Application Data Sheet as filed with the present application are hereby incorporated by reference under 37 CFR 1.57. For example, this application is related to and claims the benefit of priority from U.S. Provisional Application No. 63/439,741, titled: "A parachute design feature to reduce the effects of asymmetrical loading during the inflation process. This design feature also improves the simultaneity of parachutes used in clusters," filed on Jan. 18, 2023, the entire contents of which are incorporated by reference herein and form a part of this specification for all purposes.

TECHNICAL FIELD

Developments herein relate generally to a parachute having features to reduce effects of asymmetrical loading.

BACKGROUND

A space rocket typically includes a booster and a capsule. Reusable space rockets also include a recovery system, such as a parachute or a streamer system. The recovery system facilitates deceleration, lessens an impact of landing, and preserves the capsule for use in a future flight. Design, weight, functionality, reliability, along with many other factors may be considered in architecting such a recovery system.

The recovery system can be stored in a container within the capsule and deployed at a particular altitude during re-entry. The parachute system may include drogue parachute(s), pilot parachute(s), and main parachute(s). Initially, drogue parachute(s) can slow down, stabilize the capsule, and establish conditions for deployment of the main parachute(s). The pilot parachute(s) may be deployed to assist in dragging the main parachutes out from the container. The main parachute(s) may then be dragged out to finalize a safe landing.

During inflation of the parachute(s), air pressure acts on both the inside and the outside surfaces, which may cause folds in the parachute. When folds occur, a parachute may not pressurize evenly, leading to asymmetrical inflation and affecting optimal weight distribution, and increasing risk of a potential malfunction. There may be more than one main parachute or cluster of main parachutes, depending on the shape and load distribution. Furthermore, when parachutes are used in clusters of two or more, they inflate at different rates, leading to some generating higher loads than others. To account for the above-described impediments, each parachute is architected with a structural integrity to survive the highest loading conditions, resulting however, in undesirable mass burden.

SUMMARY

In one example, a parachute system herein includes at least one parachute. At least one parachute includes two or more panels and includes at least one band which is in a lateral direction relative to the two or more panels. At least one band is secured at different points which are lateral mid-points in individual contiguous ones of the two or more panels. Further, a first distance between an individual set of points of the different points is shorter than twice a second distance. The second distance is a lateral distance from at least one point of the individual set of points to a seam of one panel of the two or more panels having the at least one point.

In another example, a parachute herein has at least one band which is in a lateral direction relative to a two or more panels of the parachute. The at least one band is secured at different points which are lateral mid-points in individual contiguous ones of the two or more panels.

In a further example, a method herein is for a parachute to have a less than predetermined threshold of asymmetrical loading during inflation. The method includes providing the parachute in a container. The parachute includes at least one band which is in a lateral direction relative to two or more panels of the parachute. The at least one band is secured at different points which are lateral mid-points in individual contiguous ones of the two or more panels. The method includes associating the container with a load. The method also includes enabling the container to release the parachute. The release allows an inflated version of the parachute to be formed with the less than the predetermined threshold of the asymmetrical loading based in part on the at least one band releasing material of the parachute which is between the different points.

In another example, a method herein is for manufacturing or preparing a parachute. The method includes associating together two or more panels to form different reinforcement stitches or reinforcement points for the parachute. The method also includes securing at least one band to different points which are lateral mid-points in individual contiguous ones of the two or more panels. The at least one band is in a lateral direction relative to the two or more panels. The method further includes associating the parachute with a vent band and skirt band and providing one or more suspension lines, risers, or links to substantially complete the parachute.

BRIEF DESCRIPTION OF DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from spirit or scope of the subject matter presented here. In some drawings, various structures according to embodiments of the present disclosure are schematically shown. However, the drawings are not necessarily drawn to scale, and some features may be enlarged while some features may be omitted for the sake of clarity. It will be readily understood that the aspects of the present disclosure, as generally described herein, and illustrated in the figures, can be arranged, substituted, combined, and designed in a wide variety of different configurations, all of which are explicitly contemplated and make part of this disclosure. As noted above, the drawings as depicted are not necessarily drawn to scale. The relative dimensions and proportions as shown are not intended to limit the present disclosure, unless indicated otherwise.

DETAILED DESCRIPTION

As used herein, a parachute system includes at least one parachute and may include a cluster of two or more parachutes. As used herein, a parachute system may also include drogue parachute(s), pilot parachute(s), and any other parachutes that may be individual parachutes that may benefit from the description herein. As used herein, a parachute may include two or more panels, also referred to herein as gores. As used herein, a panel may be of a singular fabric or may include multiple fabrics. Where the singular fabric is a panel, it may be attached to another singular fabric of the same or similar shape and that forms another panel. Where the multiple fabrics are altogether a singular panel, such multiple fabrics can be attached to other multiple fabrics of a same or similar shape and which forms another singular panel. Also as used herein, the panel may be triangular in shape and may extend from an apex to a base. As used herein, the apex may be the narrowest part of the panel and the base may be the broadest part of the panel. The base may be a straight cut or may be curved or may have curves. The parachute includes at least one band or cord which is in a lateral direction relative to two or more panels. As used herein, the band may extend laterally and may have a radial dimension, such as a width, that is in a radial direction. A smaller width may be used with the band and may be referred to herein as a cord, but the band or cord achieves the benefits described herein. As used herein, the band or cord may be a singular fabric or may include multiple fabrics. The band may be provided of any suitable material used in a parachute, such as high tensile nylon yarn, and may be the same as or may be different from a material or materials used for a panel.

As used herein, the lateral direction may be along a length of the base of the panel or a circumference of the parachute. As used herein, the radial direction may along a length from the apex to the base of a panel. The at least one band may be secured at different points which are lateral mid-points in individual contiguous ones of the two or more panels. As used herein, a lateral mid-point may be a point that in the lateral direction on a panel and that is approximately at a middle, in the lateral direction, between seams of the panel that are reinforced or to be reinforced with other contiguous panels to form the parachute. As used herein, the seams may be part of a panel having the reinforcement with the other contiguous panels and may be also referenced to herein as reinforcement stitches or reinforcement points. Further, a first distance between an individual set of points of the different points, for securing a band, is shorter than twice a second distance. The second distance being a lateral distance between each point of the individual set of points and a respective seam. The first distance may be measured as a straight line between the points (and may represent a length of a sub-band that forms the band). The second distance may be measured as a lateral distance that accounts for a curvature of the panel, as illustrated and described with respect to FIGS. 4A-6 herein. The lateral distance may be from at least one point of the individual set of points to a respective seam of the panel having the at least one point.

Figure 1:
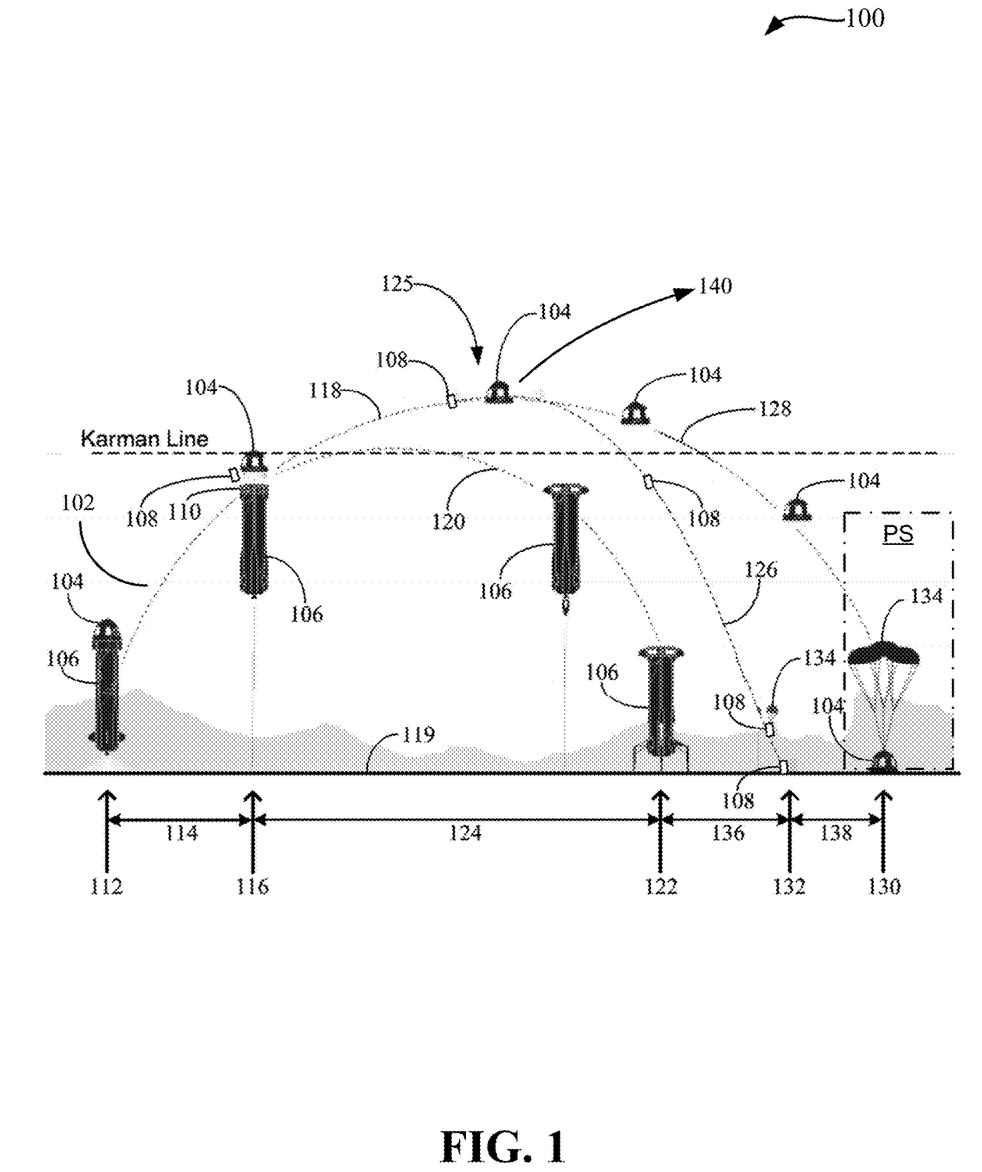
FIG. 1 illustrates a flight sequence with at least one re-entry capsule that is associated with parachutes of a parachute system having features to reduce effects of asymmetrical loading during inflation, according to at least one embodiment.

FIG. 1 illustrates an example of a flight sequence 100 with at least one re-entry capsule 104 atop of a propulsion module (booster) 106. The capsule 104 includes a parachute system (PS). The parachute system is stored during launch an ascent and activated during a descent. In one example, the parachute system includes a one or more, or a cluster of parachutes 134. Each parachute includes panels extending radially from the center of a dome, or an apex of the parachute. Two or more panels include a band in a lateral direction relative to the seams of the two or more panels, as described further with respect to one or more of FIGS. 2-8. The at least one band may be secured circumferentially (also referred to herein as the lateral direction) around the parachute dome, and/or laterally to the panels at different points so that the at least one band passes over or under any reinforcement stitches or reinforcement points of the two or more panels. This can prevent infoldings of the parachute fabric during inflation.

Further, the positioning of the band, or cord, herein enables each of such parachutes 134, in their respective inflated versions, to have less than a predetermined threshold of the asymmetrical loading based in part on their respective bands releasing material of the parachute between the different points. For example, an inflated version of the parachute may be unaffected by distortion based at least in part on a relief action by the at least one band to release material of the parachute between the different points. The parachute may include a first distance between an individual set of points of the different points. The parachute may also include a second distance that is a radial distance from at least one point of the individual set of points to a seam of a panel having the at least one point. The different points are such that the first distance is shorter than twice the second distance.

The parachute herein can also address the issues that occur in parachutes during inflation. For example, a parachute may not develop with an axisymmetric loading throughout its structural elements, such as its panels. The lack of an axisymmetric loading may be sometimes referred to herein as asymmetric loading. The panels may be gores (for a solid parachute, a slotted parachute, or a Ringsail parachute), ribbons (for a ribbon parachute, a ring slot parachute), or other structures used to form round parachutes or variations thereof. Asymmetrical loading may be also by a shape of the parachute not forming properly during inflation, by aerodynamics of the parachute, by improper skirt-opening shape (such as, an oblong-shaped skirt opening) during inflation, or by suspension lines experiencing differential loading. In at least one embodiment, asymmetrical loading has potential to cause parachutes to fail.

In addition, asymmetrical loading may be also caused by windshear, crosswind, positioning of the re-entry capsule, asymmetry during parachute release, or other issues. However, the parachute herein, by the at least one band being secured at different points that are radial mid-points in individual contiguous ones of two or more panels can address such issues and can also address distortion in an inflated version of the parachute. For example, based at least in part on a relief action (also referred to herein as a forcing function) by at least one band, such as to allow tension on the at least one band, so that the skirt openings can properly inflate and release material, the associated panels are allowed to remain open without distortion. Further, the securing of the at least one band in the lateral mid-points assert normal or perpendicular outward force that is the relief action or forcing function, relative to a surface of the panel. This perpendicular outward force may be a relief action which does not add lateral force or which only adds insignificant lateral force to any reinforcement stitches or points of the parachute. Such a parachute is also enabled to be re-packaged into its initial container or a different container, with an ability to maintain its purpose, which is to address asymmetrical loading, even after use and re-packaging.

In FIG. 1, a re-entry capsule 104 includes a container having the parachute, where the container is positioned to allow a specific direction of loading thereon, with respect to the re-entry capsule 104. The re-entry capsule 104 is part of a flight 102 of a propulsion module 106 and may include a crew capability (such as, being a space vehicle). The re-entry capsule 104 may be atop the propulsion module 106, which may be a rocket, such as a booster rocket. There may be a further re-entry capsule for other components that may be ejected or dispensed from one or more of the propulsion module 106 or a first re-entry capsule 104. For example, a further re-entry capsule 104 may include or be an analog-to-digital converter (ADC) that is to provide data acquisition from the flight 102. Each and all of such re-entry capsules may use a respective parachute system 134 having one or more parachutes with features to reduce effects of asymmetrical loading caused by the re-entry capsule during inflation, as described herein.

The flight 102 may be a same or a similar flight of the New Shepard® suborbital vehicle by Blue Origin®. The suborbital vehicle may be the re-entry capsule having therein a container of the parachute system. Further, while illustrated to perform re-entry from just beyond the Karman line, the re-entry capsule herein may be one that, without limitations, docks with a space station or performs space-related investigations, prior to re-entry and landing back on Earth's surface. The Karman line may be a reference point for an internationally recognized boundary of space that may be 100 kilometers or 330,000 feet above Earth's mean sea level. However, the parachute system herein may be applied to any height and any other suborbital, as well as orbital, vehicles that travel in high-Earth orbit and beyond.

In preparation for flight operations, preflight activities may be performed, which may include loading of satellites and other components, including an ADC 108, into a dispenser 110, and of the re-entry capsule to the propulsion module 106. The dispenser 110 may be located a top portion of the propulsion module 106. The preflight activities may also include preparing one or more parachute systems 134 to be loaded into respective containers of the respective components.

The flight 102 may begin with liftoff of re-entry capsule 104 and propulsion module 106 at a first time 112. Minutes later, such as, after a first time span 114 and at a second time 116, the re-entry capsule 104 separates from propulsion module 106. At or near a second time 116 (e.g., just prior to, during, or just after rocket portion separation), a dispenser 110 may eject the ADC 108 and other components, if loaded and available therein, so that the ADC and the other components have the same or similar speed and trajectory (e.g., velocity) as re-entry capsule 104, which continues to climb past the Karman line. The ADC 108 and re-entry capsule 104 both travel along a trajectory 118 that allows for delayed re-entry or along any other trajectory (indicated by an arrow 140) for purposes of docking with a space station or performing other space-related investigations prior to re-entry. Meanwhile, the propulsion module 106 falls back to Earth's surface 119, along a trajectory 120, in a booster re-entry phase, eventually landing at third time 122.

Further, a second time span 124 pertains to when the re-entry capsule 104 and ADC 108 eventually reach apogee (e.g., their maximum distance from Earth), as indicated by arrow 125, during free-flight (e.g., sans rocket propulsion) in micro-gravity (hereinafter referred to by the approximation "zero-gravity"). Although, for other trajectories there may be more time required to reach a suitable orbit or path to continue docking with a space station or performing other space-related investigations prior to re-entry. For example, a satellite may be enabled, using the illustrated other trajectory 140, to reach a suitable orbit. For at least the second time span 124, an ADC 108 may continue to be within a relatively close distance from re-entry capsule 104. In one example, this distance may be less than 5 or 6 meters but could be other suitable distances based at least in part on the application. Both, an ADC 108 and re-entry capsule 104 may be in zero-gravity for several minutes before falling back toward Earth and out of zero-gravity. However, some other components need not reach the zero-gravity threshold. The time period of several minute in zero-gravity is referred to herein as free-flight. After this period, both ADC 108 and re-entry capsule 104 begin to fall toward Earth and begin to encounter atmospheric drag.

An ADC 108 may have a ballistic coefficient (e.g., 0.6 pounds per square inch ($lb/in^2$)) greater than that of re-entry capsule 104 to ensure that no in-flight contact can occur during re-entry. The ADC 108 may be configured to land before re-entry capsule 104, to also ensure no in-flight contact. Although for other components landing or re-entering after performing docking, investigations, other space missions, the landing herein may be directed to a single re-entry capsule or other singular component. The ADC 108, having a ballistic coefficient greater than that of re-entry capsule 104, may follow a trajectory 126 that is substantially different from a trajectory 128 than the re-entry capsule 104. These two trajectories may lead to an increasing separation distance and help to prevent the possibility of a collision between the two objects. Flight 102 ends when re-entry capsule 104 or other component, travelling along trajectory 128, lands on Earth's surface 119 at first landing time 130. The ADC 108, travelling along trajectory 126, lands on Earth at second landing time 132. Each of the re-entry capsule 104 and the ADC 108 may use one or more parachutes 134 as part of a parachute system to slow their descent. A further time span 136 may separate the landing times of the propulsion module 106 and the ADC 108. Yet another time span 138 may further separate the landing times of the ADC 108 and of the re-entry capsule 104.

A re-entry capsule 104 may be used to carry equipment to and frame space, samples to space, samples from space, or crew or passengers. In at least one embodiment, the re-entry capsule 104 may be autonomously or remotely controlled so that only passengers are on board without the passengers requiring to control the re-entry capsule 104. Thus, the flight 102 and the re-entry capsule 104 may be configured for any suitable space mission, including for docking with a space station, for space investigation, sample recovery, deep space travel and return, space tourism, and rendering photography.

Further, for all such space missions that at least require re-entry of a component, stability of the re-entry capsule or other component is crucial. While the parachutes 134 of the parachute system is illustrated as fully deployed (or in an inflated version) on Earth's surface 119, the opening occurs at least more than 1,500 feet above the Earth's surface 119. In an example, the illustrated parachutes 134 in FIG. 1 are main parachutes. However, there may be pilot parachutes that may be deploy at a first predetermined height that may be lower than drogue parachutes and are particularly to assist in dragging the main parachutes 134 out from the container of the re-entry capsule 104, although this may be similar in the case of the ADC 108 or any other component subject to re-entry. A parachute, as used herein, may apply to one or more of such main and other parachutes.

A lack of axisymmetric loading may be accounted for by increasing a strength of the structural elements of such parachutes 134. However, this also increases mass and volume of the parachute. When parachutes 134 are used in clusters, as illustrated in FIG. 1, there clusters may be also referred to herein as a parachute system (labeled as PS). Therefore, the reference to the parachutes 134 associated with the re-entry capsule 104 is a reference to a parachute system or a cluster of two or more parachutes. These parachutes may inflate at different rates as a result, in part, of the asymmetric loading. This may cause higher loads on at least one parachute than others in the cluster. Further, there are complexities in determining a parachute in a cluster that may generate a highest load. As such, parachutes to be used in clusters may be designed to have structural integrity to survive highest-loading conditions, which results in the aforementioned mass burden and are bulky from being of increased mass and volume. The parachute herein addresses a root cause of the asymmetry and improper cluster inflation while being mindful of a mass and volume burden.

Figure 2:
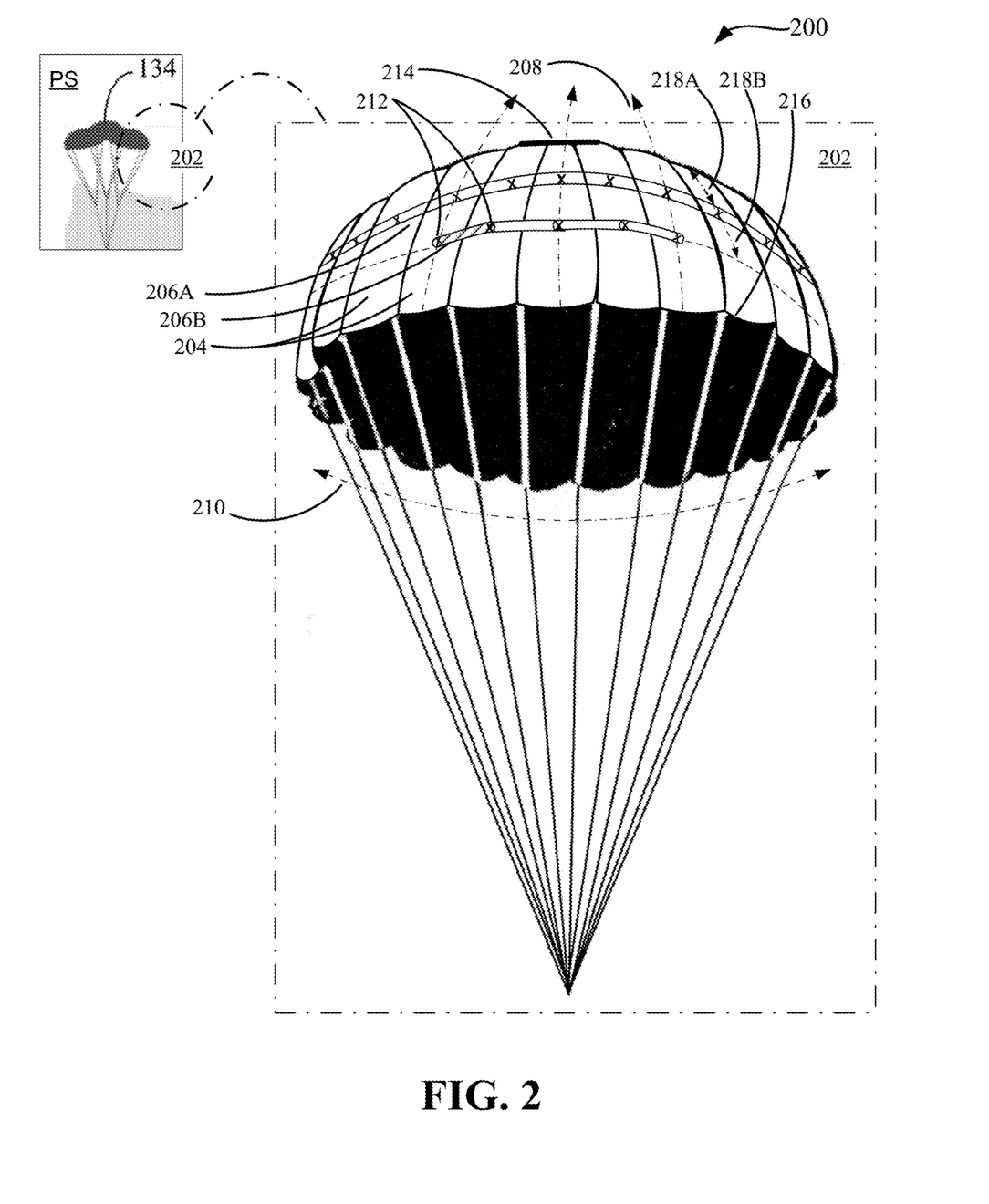
FIG. 2 illustrates features of a parachute in a parachute system to reduce effects of asymmetrical loading during inflation, according to at least one embodiment.

FIG. 2 illustrates features 200 of a parachute in a parachute system (PS) to reduce effects of asymmetrical loading during inflation, according to at least one embodiment. The parachute 202 illustrated in FIG. 2 may be part of the parachute system 134 of FIG. 1. Therefore, even though discussed as to the singular parachute 202, the features 200 are applicable to each of the parachutes in the parachute system 134. While the parachute system 134 includes one or more parachutes 202 to be used with a load, such as the re-entry capsule 104 of a rocket, the parachute system can be used with any airborne load. The one or more parachutes 202 may include two or more panels 204 and may include at least one band 206A or 206B which is in a lateral direction 210 (or circumferential) relative to a radial direction 208 that is from an apex to a base of each of the two or more panels 204.

Further, FIG. 2 illustrates that the at least one band 206A or 206B may be a singular continuous structural element, as in the upper band 206A or may include different sub-bands, as in the lower band 206B. Further, the lower band 206B is illustrated with four sub-bands but may include further sub-bands around the entire circumference and affecting every panel 204. In either type of band 206A; 206B, the band is secured at different mid-points 212 that are lateral mid-points in individual contiguous ones of the panels 204.

For the shaded sub-band of the lower band 206B, each end of the sub-band is secured to a respective mid-point 212. The respective mid-points 212 are lateral mid-points in individual contiguous or neighboring panels 204. Therefore, every panel 204 includes at least one mid-point 212 for securing a band that is a continuous band or an end of a sub-band if the band is made of sub-bands. These mid-points 212 may be lateral mid-points as they are mid-points within the panel, at a radial length in the radial direction 207 from the apex or the base of the panel. The mid-points are also with respect to the lateral direction 210 for the parachute 202. Therefore, the sub-band may be at a determined radial length from the apex or the vent band 214. However, the radial length may also be fixed with respect to a skirt band 216 at a bottom edge of the parachute 202.

In one example, the radial length may be based in part on a first distance and a second distance calculated for the parachute. The first distance may be between an individual set of mid-points 212 for a sub-band. Therefore, the first distance is between mid-points of two contiguous panels. The individual set of mid-points 212 may be determined so that the first distance is shorter than twice the second distance. The second distance is a lateral distance from at least one point of the individual set of mid-points 212 to a seam of the panel having the at least one point. The first distance may be a straight line, whereas the second distance accounts for a curvature of panel from each mid-point to a seam of the panel at issue. This is detailed further in FIGS. 5A and 5B.

Further, as illustrated in FIG. 2, there may be two or more bands that are circumferentially distinct for every parachute 202. These two or more bands are distinct from the sub-bands that may form part of one band around a circumference of the parachute. For example, there may be conditions or applications with only one band provided and there may be other conditions or applications requiring two or more bands. When two or more bands are provided, at least a first of the two or more bands (such as the upper band 206A) may be located at first distance 218A that is at a first threshold, relative to an apex or vent band 214 (or base) of the parachute 202. Further, at least a second of the two or more bands (such as the lower band 206B) may be located at a second distance 218B that is at a second threshold relative to an apex or vent band 214 (or base) of the parachute 202.

Figure 3:
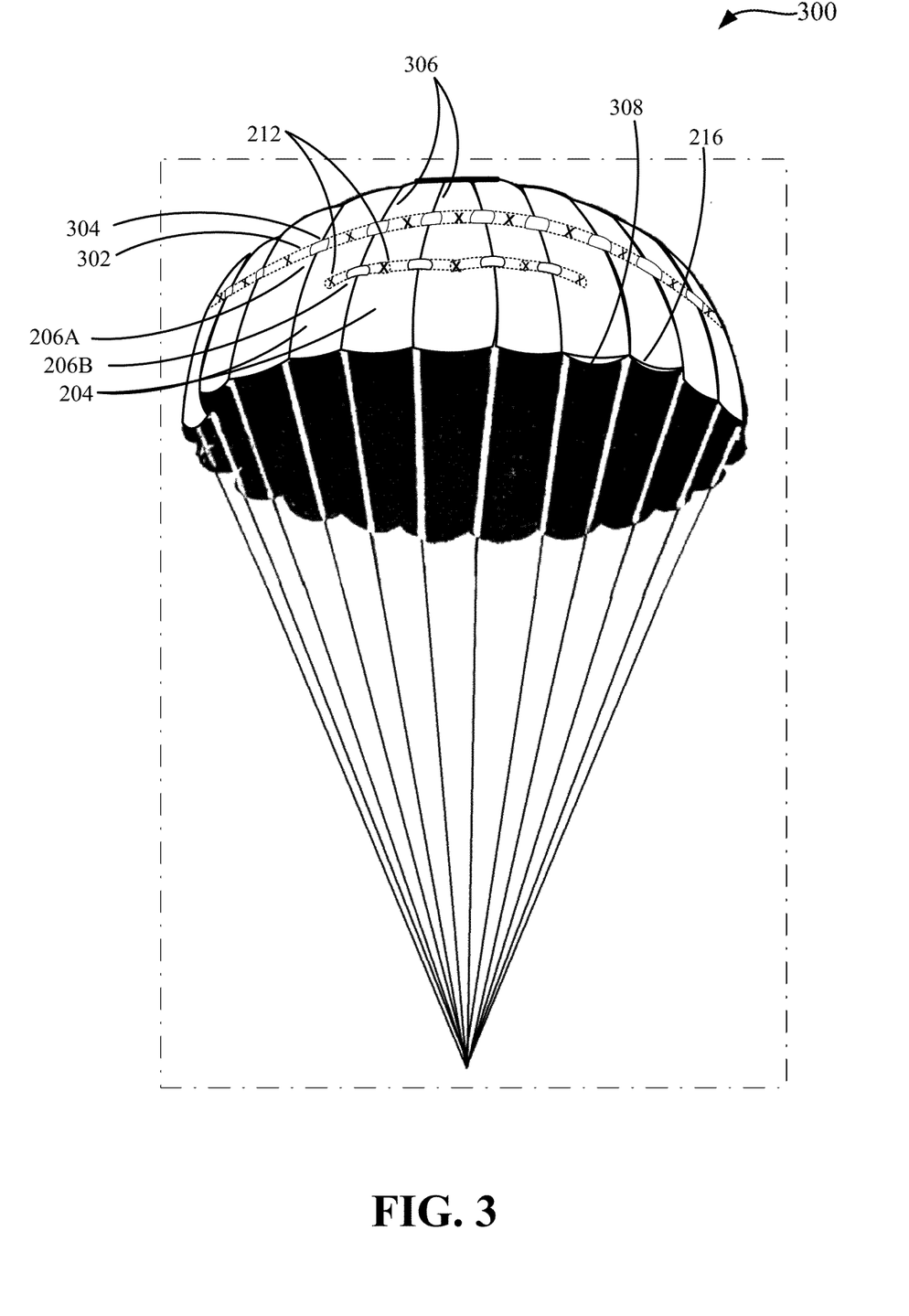
FIG. 3 illustrates further features of a parachute in a parachute system to reduce effects of asymmetrical loading during inflation, according to at least one embodiment.

FIG. 3 illustrates further features 300 of a parachute in a parachute system to reduce effects of asymmetrical loading during inflation, according to at least one embodiment. For example, the parachute system 134 may be such that the parachute has its band 206A; 206B secured at mid-points 212 that are inside of the panels 204. Whereas, in FIG. 2, the band 206A; 206B is secured at mid-points 212 that are outside of the panels 204. As such, a part 302 (broken lines)

of the band 206A; 206B, whether continuous or including sub-bands, is not visible outside the parachute 202 and only a smaller part 304 (solid line) of the band 206A; 206B may be visible externally. However, in either implementation, the band is secured at the lateral mid-points 212 of the panels 204 to assert normal or perpendicular outward force, relative to a surface of the panel. The parachute system 134 may also be such that the band 206A; 206B, whether continuous or including sub-bands, passes over or under any reinforcement stitches or points 306 of the panels 204. In FIG. 3, the reinforcement stitches or points 306 is at the seams of the panels 204.

Figure 4A:
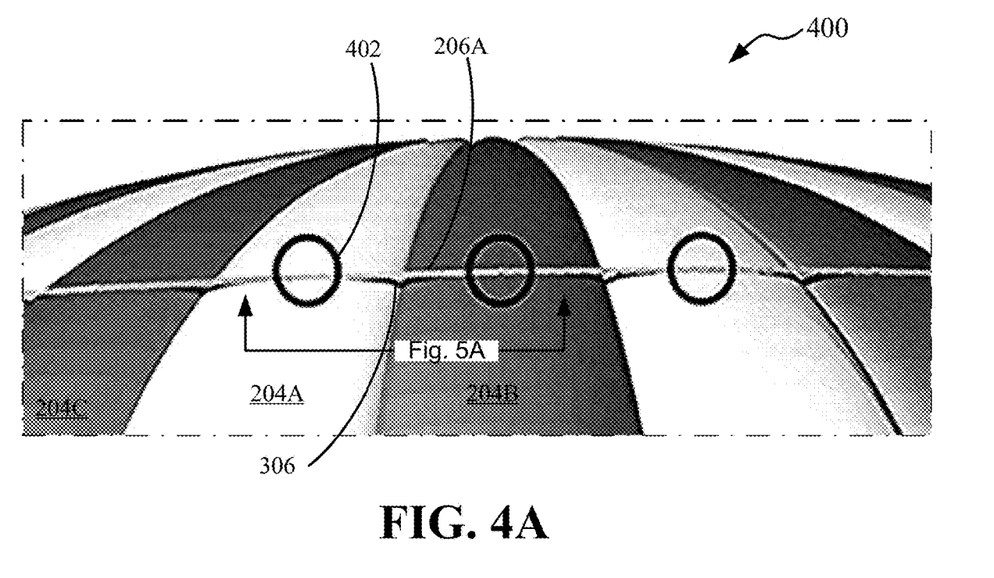
FIG. 4A illustrates features of a band which is fully external and which is to reduce effects of asymmetrical loading during inflation of a parachute, according to at least one embodiment.

FIG. 4A illustrates features 400 of a band, such as an upper band 206A, that is fully external to reduce effects of asymmetrical loading during inflation of a parachute, according to at least one embodiment. As illustrated, the mid-points 212 for securing the upper band 206A are in areas 402 that are mid-lateral for each panel 204. This allows the upper band 206A to pass over any reinforcement stitches or points 306 of the panels. For example, the upper band 206A pass over reinforcement stitches or points 306 of a first panel 204A and its contiguous second panel 204B on one side. This is also the case, however, with a contiguous third panel 204C on the other side of the first panel 204A. The upper band 206A is also not taut in a manner to change a shape intended for the panels 204 or the parachute 202 as a whole. However, the upper band 206A is able to, based at least in part on a relief action that is a normal or perpendicular outward force or a tension on the band, allow skirt openings 308 at the skirt band 216 to properly inflate. This, in turn, allows the associated panel to the skirt openings to be allowed to remain open without distortion.

Figure 4B:
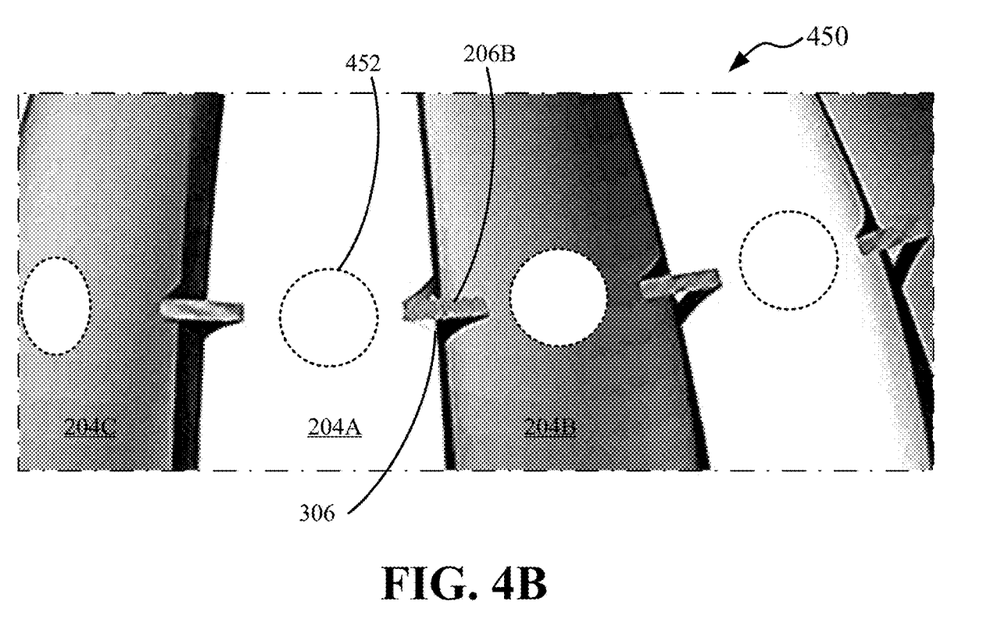
FIG. 4B illustrates features of a band which is partly external and which is to reduce effects of asymmetrical loading during inflation of a parachute, according to at least one embodiment.

FIG. 4B illustrates features 450 of a band, such as a lower band 206B, that is partly external to reduce effects of asymmetrical loading during inflation of a parachute, according to at least one embodiment. As illustrated, the mid-points 212 for securing the lower band 206B are in areas 452 that are mid-lateral for each panel 204. This allows the upper band 206A to pass over under any reinforcement stitches or points 306 of the panels, such as of a first panel 204A and its contiguous second panel 204A on one side. This is also the case, however, with a contiguous third panel 204C on the other side of the first panel 204A. The lower band 206B is also not taut in a manner to change a shape intended for the panels 204 or the parachute 202 as a whole, and the discussion to allow skirt openings 308 at the skirt band 216 to properly inflate also applies here. Differently than in FIG. 4A, some of the features 450 in the lower band 206B, including the securement mid-points 212, are hidden from view. However, it is understood that the securement mid-points 212 are in an area 452 that within the skirt openings 308.

Figure 5A:
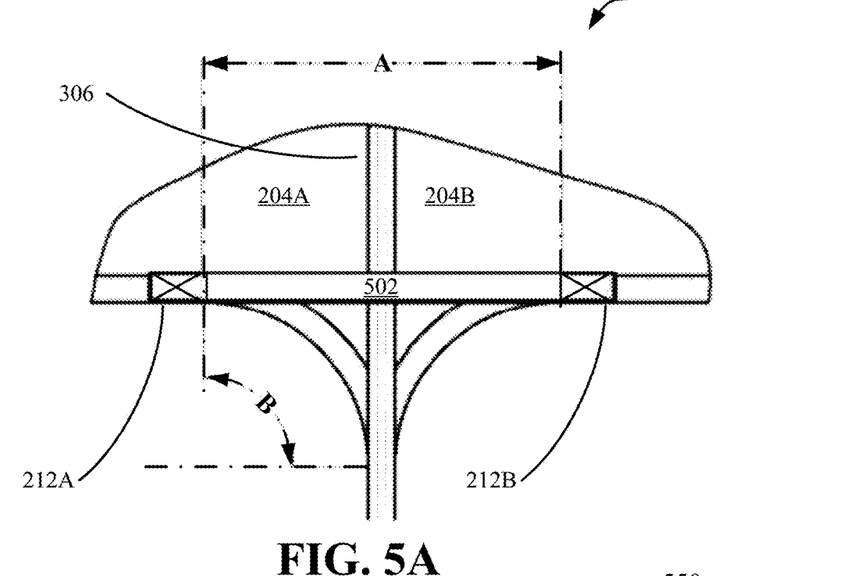
FIG. 5A illustrates measurement details of some features to reduce effects of asymmetrical loading during inflation of a parachute, according to at least one embodiment.

FIG. 5A illustrates measurement details 500 of some features to reduce effects of asymmetrical loading during inflation of a parachute, according to at least one embodiment. Further, FIG. 5A is a cross-sectional view that is across two of the panels 204A, 204B of the parachute 202, with a seam 306 at the center. The measurement details 500 include that a first distance "A" between an individual set of mid-points 212A, 212B that is across at least two panels 204A, 204B is shorter than twice a second distance "B" that is a lateral distance from at least one mid-point 212A of the individual set of points to a seam 306 of a first panel 204A having the at least one mid-point 212A of the individual set of points (mathematically represented as, A<2×B (Equation 1)). Therefore, even though illustrated as a curve, the second distance "B" follows a lateral length of a surface of the first panel 204A.

In at least one embodiment, as the sets of mid-points 212A, 212B are between a sub-band 502, the first distance "A" may be the length of a sub-band 502, assuming that the securement points are near the edge of the sub-bands. Further, the measurement details 500 can also limit the placement of the bands 206A, 206B as the wider the panel gets towards a skirt band, the less likely is it possible to maintain such a measurement. Particularly, as the bands herein at to prevent distortion of the parachute in the inflated version. In at least one embodiment, as illustrated, the parachute system 134 is such that at least one band, such as a lower band 206B, includes sub-bands where an individual sub-band 502 may be secured at a first lateral mid-point 212A of a first panel 204A and where the individual sub-band 502 is also secured at a second lateral mid-point 212B of a second panel 204B that is contiguous to the first panel 204A.

Further, as also understood from the illustration in FIG. 5A, the parachute system 134 is such that a further individual sub-band that is to secure between the aforementioned first panel 204A and an opposite side contiguous third panel 204C will likely require securing the further individual sub-band at a third lateral mid-point of the third panel and securing at the same first lateral mid-point 212A of the first panel 204A. Therefore, there may one sub-band overlapping another sub-band, at least at the securement mid-points 212. In at least one embodiment, all such securing is provided by stitching, gluing, or bonding.

Figure 5B:
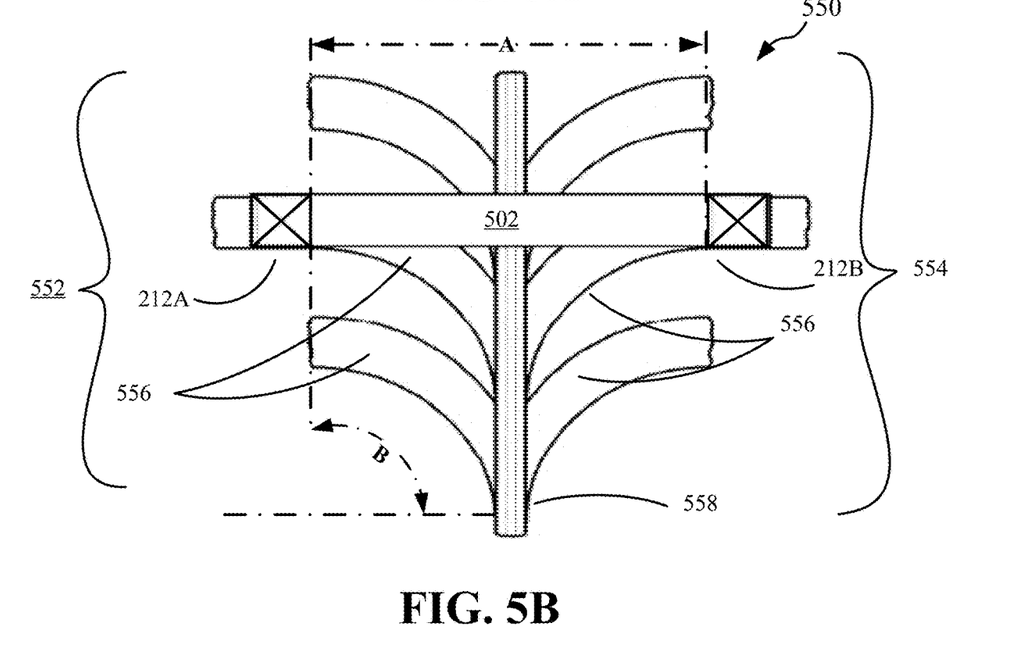
FIG. 5B illustrates further measurement details of some features to reduce effects of asymmetrical loading during inflation of a parachute, according to at least one embodiment.

FIG. 5B illustrates further measurement details 550 of some features to reduce effects of asymmetrical loading during inflation of a parachute, according to at least one embodiment. Differently than in FIG. 5A, the measurement details 550 include ribbons 556 and a parachute having such ribbons 556 is referred to as a ribbon parachute. FIG. 5B may be also a cross-sectional view that is across two of the panels 552, 554 of a ribbon parachute, with a seam 558 at the center between the panels 552, 554. The measurement details 550 include that a first distance "A" between an individual set of mid-points 212A, 212B that is across at least two panels 552, 554 is shorter than twice a second distance "B" that is a lateral distance from at least one mid-point 212A of the individual set of points to a seam 558 of a first panel 552 having the at least one mid-point 212A of the individual set of points. Similarly, as with respect to FIG. 5A, even though illustrated as a curve, the second distance "B" follows a lateral length of a surface of the ribbons 556 forming the first panel 552.

Here too, as the sets of mid-points 212A, 212B are between a sub-band 502, the first distance "A" may be the length of a sub-band 502, assuming that the securement points are near the edge of the sub-bands. Further, the measurement details 550 can also limit the placement of the bands 206A, 206B as the wider the panel gets towards a skirt band, the less likely is it possible to maintain such a measurement. Particularly, as the bands herein are to prevent distortion of the parachute in the inflated version. In at least one embodiment, as illustrated, the parachute system 134 is such that at least one band, such as a lower band 206B, includes sub-bands where an individual sub-band 502 may be secured at a first lateral mid-point 212A of a first panel 552 and where the individual sub-band 502 is also secured at a second lateral mid-point 212B of a second panel 554 that is contiguous to the first panel 552.

Further, as also understood from the illustration in FIG. 5A, the parachute system 134 is such that a further individual sub-band that is to secure between the aforementioned first panel 552 and an opposite side contiguous third panel 204C will likely require securing the further individual sub-band at a third lateral mid-point of the third panel and securing at the same first lateral mid-point 212A of the first panel 552. Therefore, there may one sub-band overlapping another sub-band, at least at the securement mid-points 212. In the ribbon parachute as well, the securing is provided by stitching, gluing, or bonding.

A width of the bands may be determined based at least in part on the application and the requirements of the parachute, including a loading factor and the size of the parachute. This will assist in determining an amount of the relief action required by at least one band on at least one of the panels to ensure that the parachute is unaffected by distortion in the inflation version. For example, the bands creates or enables the relief action or a forcing function within the inflating parachute to facilitate uniform, symmetrical inflation, and hence structural loading in both individual parachutes and parachutes in a cluster or parachute system.

Figure 6:
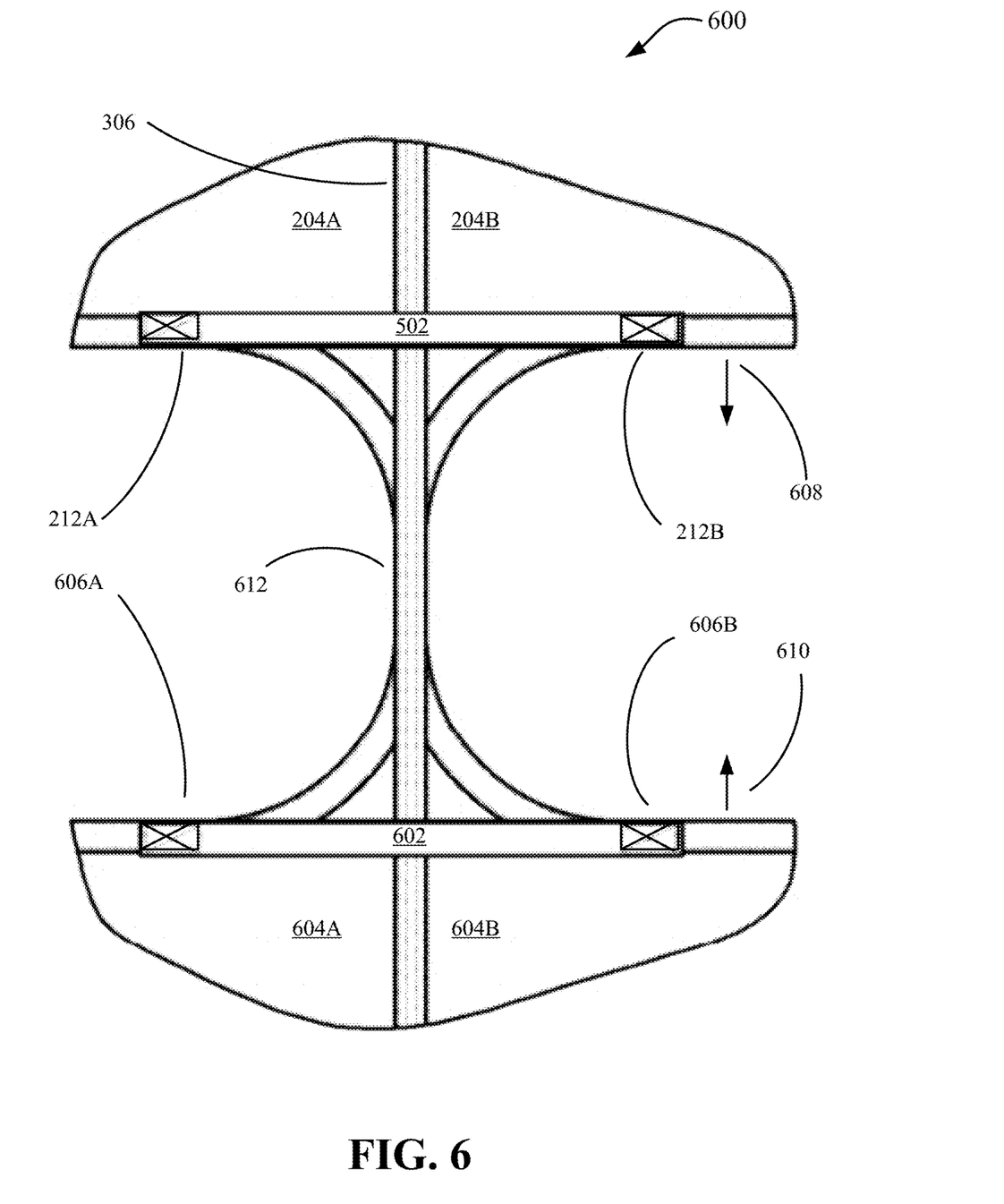
FIG. 6 illustrates further features of different bands to reduce effects of asymmetrical loading during inflation of a parachute, according to at least one embodiment.

FIG. 6 illustrates further features 600 of different bands to reduce effects of asymmetrical loading during inflation of a parachute, according to at least one embodiment. For example, the features 600 illustrate the sub-bands 502, 602 in the directions of a leading edge 608 and of a trailing edge 610 of four panels 204A, 204B, 604A, 604B. Even though illustrated with the directions of the leading edge 608 and the trailing edge 610, these edges are away and closer to a skirt or lateral band formed at the skirt of the parachute 202. In at least one embodiment, the four panels 204A, 204B, 604A, 604B may be associated at the same or overlapping seams 306 of a radial member 612. In at least one embodiment, the radial member 612 is a reinforced textile that extends from the leading edge 608 to the trailing edge 610. The sub-bands 502, 602 are, however, over or under the radial member 612 and do not affect the seams 306 that represent reinforcement stitches or points. As illustrated, however, the sub-bands 502, 602 are secured at mid-points 212A, 212B, 606A, 606B on their respective panel on lateral mid-points that are on either sides of the seam 306.

The sub-bands 502, 602 herein create a relief action or a forcing function within the inflating parachute to facilitate uniform and symmetrical inflation. As a result, structural loading in both individual parachutes and parachutes in a cluster is improved. In at least one embodiment, the sub-bands 502, 602 are able to keep the skirt openings open so that the parachutes, once in the inflated version, are unaffected by distortion. In at least one embodiment, as the sub-bands 502, 602 do not interfere with existing structure, including of reinforcement stitches or points, these sub-bands 502, 602 may be retroactively applied on existing parachutes, in an unobtrusive and mass efficient manner.

A parachute herein, having such sub-bands 502, 602, may have a less than predetermined threshold of asymmetrical loading during inflation. For example, the asymmetrical loading of parachute without such sub-bands 502, 602 and with such sub-bands 502, 602 may be shown to be different. The predetermined threshold may be established for a same parachute type and may be used with similar parachutes to provide the less than predetermined threshold of asymmetrical loading during inflation by the addition of the sub-bands 502, 602 at the lateral mid-points and without disturbing existing structure, including of reinforcement stitches or points. The sub-bands 502, 602 may also require less re-qualification for a retrofitted existing parachute, should they be employed on existing parachute systems, in comparison to reinforcement changes performed that may affect the mass, volume, and the performance of the parachute.

Further, the sub-bands 502, 602 at the lateral mid-points and without disturbing existing structure can also address a root cause of asymmetrical and cluster inflation problem. For example, parachute systems may otherwise be designed to assuage effects of problems caused by the initial loading mechanism by aforementioned additional mass and volume burden. In at least one embodiment, however, the sub-bands 502, 602 herein, at the lateral mid-points and without disturbing existing structure, may be applied at different regions for a panel and are referred to herein based on those regions, so long as such an application satisfies Equation 1. The reference may be to a mid-gore asymmetry band, a partial gore asymmetry band, a mid-gore asymmetry cord, partial gore asymmetry cord. Further, the reference to cord or band is interchangeable and may be used to imply a width distinction based in part on the application.

In at least one embodiment, the sub-bands 502, 602 herein, by passing over or under reinforcement stitches or points are distinguished from vent bands, skirt or lateral bands, and pocket bands that are reinforcement bands. Further, at least the pocket bands may spread a skirt of the parachute when it is presented to an airflow, whereas the sub-bands 502, 602, at the lateral mid-points and without disturbing existing structure, can spread an inflating and pressurized region of the parachute 202 during the inflation process or in an inflated version of the parachute. As a pressurized region of the parachutes moves from an apex, crown, or vent band to the skirt or lateral band, each discrete region may be symmetrically distributed due to tension that is, in part, the relief action, by the sub-bands 502, 602 that are at the lateral mid-points and that do not disturb existing structure of the parachute. Each region of the parachute is forced in an outward direction by this tension, normal, or perpendicular outward force. Therefore, any in-folding of any drag surface of the parachute is obviated.

Figure 7:
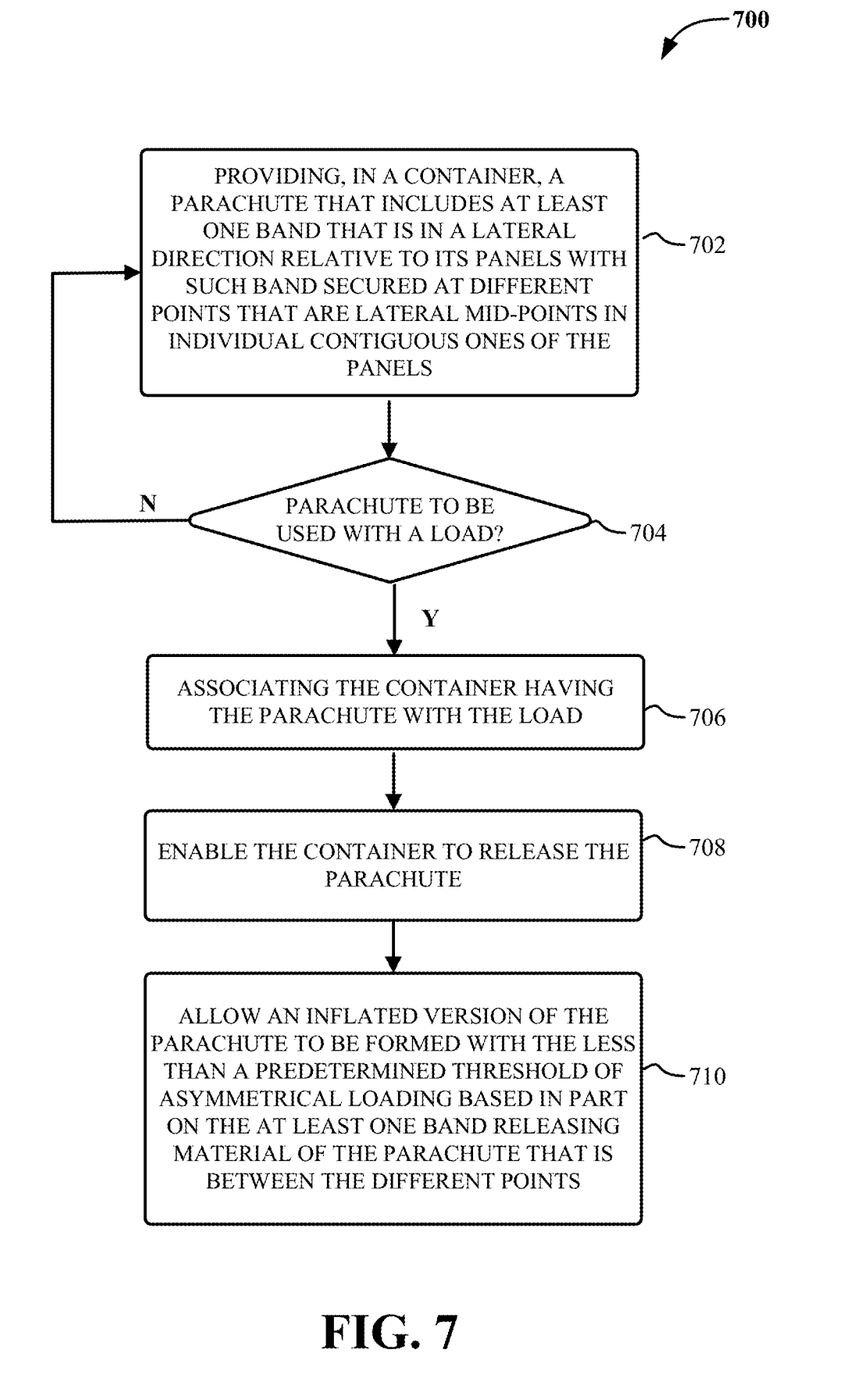
FIG. 7 illustrates a process flow for a parachute of a parachute system having features to reduce effects of asymmetrical loading during inflation, according to at least one embodiment.

FIG. 7 illustrates a process flow or method 700 for a parachute of a parachute system having features to reduce effects of asymmetrical loading during inflation, according to at least one embodiment. In at least one embodiment, the method 700 is for a parachute to have a less than predetermined threshold of asymmetrical loading during inflation. For example, when a parachute that is provided with the bands that are at the lateral mid-points of respective panels is subject to inflation to provide an inflated version, there may be air pressure acting on both, inside and outside surfaces of the parachute. This may result in a condition where a local drag surface may fold either in an inward or outward direction. When sections or panels of the drag surface fold inwards, they do not pressurize and, therefore, generate a lower force than those regions which have folded outwards and have been pressurized. This behavior results in asymmetry within individual parachutes and differences in inflation times of parachutes in a cluster or the parachute system 134. The bands that are at the lateral mid-points of respective panels herein cause a tension, normal, or perpendicular outward force to the regions of the parachute that are tending to fold inwards and causes them to quickly pressurize in an outward direction.

To apply the benefits described herein with a load, the method 700 includes providing 702 a parachute to be in a container. The parachute may include the at least one band that is in a lateral direction relative to panels of the parachute. Further, the at least one band is secured at the points that are lateral mid-points in individual contiguous ones of the panels of the parachute. When it is determined 704 to use the parachute with a load, an association 706 step may be performed to associate the container having the parachute with a load. In at least one embodiment, a parachute suitable to the loading requirements of the load may be selected or provided for the container. Further, the loading requirements may also include the requirements for asymmetrical loading to be achieved in the parachute system which includes the parachute. For example, a predetermined threshold of asymmetrical loading during inflation for a range of parachutes for the load or without the load may be determined and associated with the requirements for the determination step 704.

The method 700 includes enabling 708 the container to release the parachute. This may be different for different applications and may include different set-release features, including setting a pilot chute or setting a container pin or other trigger to hold, in a closed position, the one or more parachutes having their respective bands. The method 700 is such that a further step allows 710 an inflated version of the parachute to be formed with the less than the predetermined threshold of the asymmetrical loading based in part on the at least one band releasing material of the parachute that is between the different points. For example, the bands secured at the lateral mid-points of respective panels herein cause a tension, normal, or perpendicular outward force to the regions of the parachute that are tending to fold inwards and causes or allows 710 the inflated version of the parachute to be formed to quickly pressurize in an outward direction.

In at least one embodiment, the method 700 may include a further step or sub-step for preventing distortion in the inflated version of the parachute based at least in part on a relief action by the at least one band on at least one of the plurality of panels. For example, even though the inflated version of the parachute to be formed and the tension, normal, or perpendicular outward force allows pressurizing in an outward direction, the bands are also to prevent distortion by retaining such tension, normal, or perpendicular outward force over course of use of the inflated version of the parachute. In at least one embodiment, further, the method 700 includes a step or sub-step for enabling the parachute to be re-packaged into the container or a different container for re-use. For example, an ability to perform the release of the inflated version of the parachute remains after the re-packaging and so, the bands enable the parachute to be re-used with change to their structure or performance relative to a first use with the bands in the mid-lateral securing points.

Figure 8:
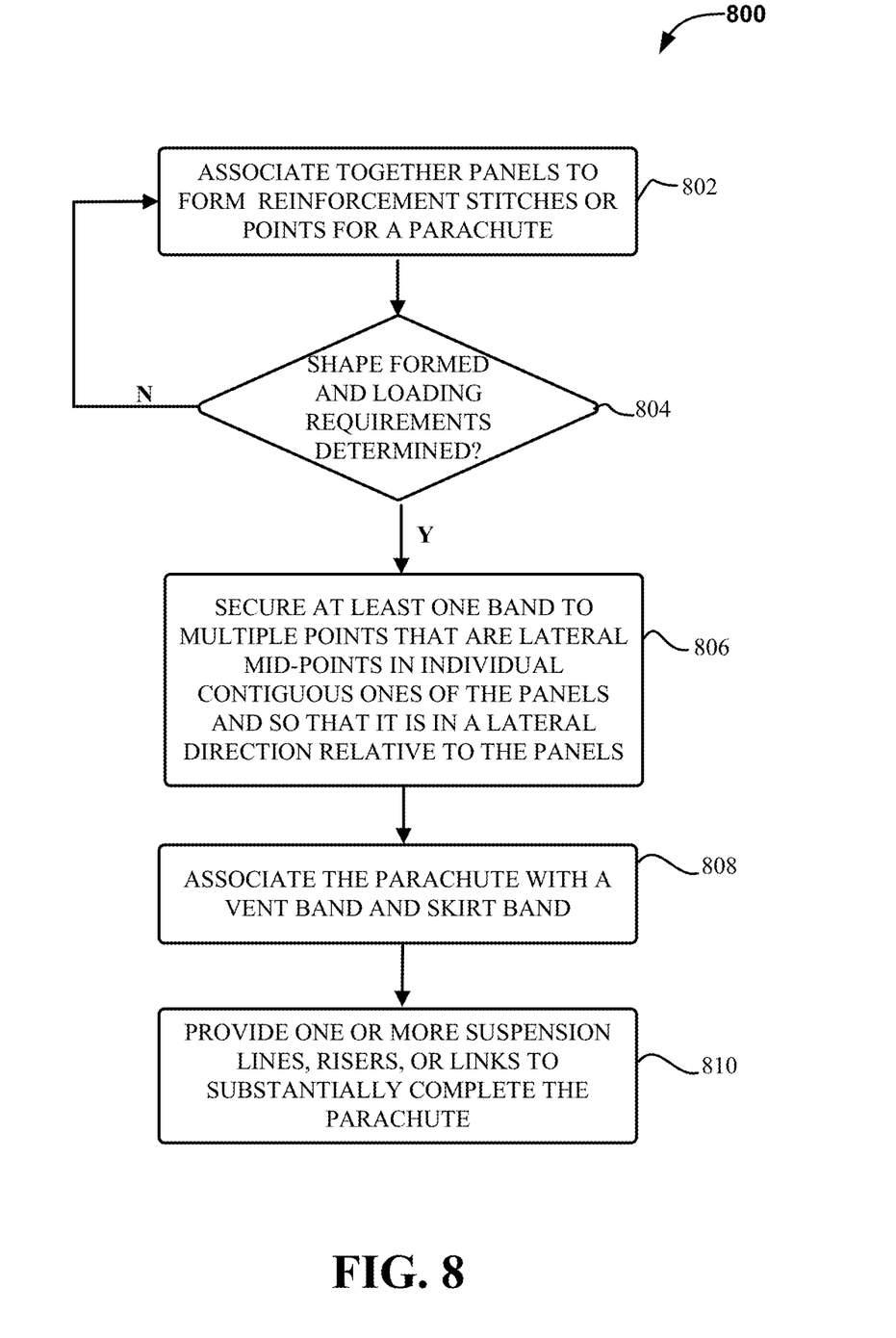
FIG. 8 illustrates a process flow for manufacturing a parachute of a parachute system having features to reduce effects of asymmetrical loading during inflation, according to at least one embodiment.

FIG. 8 illustrates process flow or method 800 for manufacturing or preparing a parachute of a parachute system having features to reduce effects of asymmetrical loading during inflation, according to at least one embodiment. In at least one embodiment, this method 800 may be performed prior to the use method 700 of FIG. 7. The method 800 in FIG. 8 includes associating 802 together the panels to form reinforcement stitches or points for a parachute. Once this is complete and the shape, as well as, the loading requirements are determined or confirmed in step 804, a step to secure 806 at least one band to different points that are lateral mid-points in individual contiguous ones of the panels may be performed.

Further, depending in part on the shape and the loading requirement, the bands and their location may be determined in this step. For example, Equation (1) may be used to determine a location of one or more bands and the load may be used to determine the width and circumferential use, for instance, of the one or more bands. In all such determinations, the at least one band is in a lateral direction relative to the panels. The method 800 includes associating 808 the parachute with a vent band and skirt band. In at least one embodiment, a vent band is provided at a crown or apex of the parachute without a vent although the reference is still made to a vent band herein. The method 800 includes providing 810 one or more suspension lines, risers, or links to substantially complete the parachute.

The bands herein, which are at the lateral mid-points of respective panels, may be attached by traditional sewing, adhesive bonding, or welded to an outside or inside of the parachute drag surface, as part of the securing 806 step. As part of the determining step 804, the bands in the securing 806 step are sized such that once the parachute is fully inflated, in the inflated version, the panels are no longer under tension to collapse or in-fold. The bands ensure that the panels do not distort a natural inflated shape. As described throughout herein, the width of the bands may be determined based at least in part on the loading requirements of the parachute and the application of the parachute. The length of the continuous band or a sub-band may also depend on such loading requirements but may generally be fully circumferential.

Further, there may be more than one band that can be added to a parachute, and which is also a factor of the loading requirement. The number of bands may be as required by a number of gores and a number of inflation stages. For example, the at least one band enables reefed inflation stages for the parachutes. Larger parachutes may include a larger number of the bands. Therefore, based in part on loading requirements from a performance test, at least one band is included in a parachute at a predetermined location and more than one band may be provided based in part on the loading requirements for a specific application.

Still further, it is possible to attach the bands to an existing parachute system or include them in a new parachute design, as part of the determining and securing steps of the method 800 in FIG. 8. The bands at their mid-lateral points improve both asymmetry and cluster load share behavior for the parachute and the parachute system. As such, the methods 700, 800 herein support a parachute design to reduce the effects of asymmetrical loading during an inflation process. The methods 700, 800 herein results in a parachute that has improved simultaneity when used in parachute systems or clusters.

The method 800 in FIG. 8 may include a further step or a sub-step for determining a first distance between an individual set of points of the plurality of points. Yet another step or a sub-step in method 800 is for determining a second distance that is a lateral distance from at least one point of the individual set of points to a seam of panel having the at least one point. Then, the method 800 includes providing the securing 806 to make the first distance shorter than twice the second distance, according to Equation (1), described elsewhere herein.

The method 800 in FIG. 8 may include a further step or a sub-step for determining a type of the parachute that allows internal or external securing of the at least one band and may be performed as part of the determining step 804 for the parachute shape and the loading requirements or may be performed as part of the securing 806 step. The method 800 in FIG. 8 includes a further step or a sub-step for performing the securing 806 of the at least one band at predetermined points that are outside or inside of the panels, but so that the reinforcement stitches or points from the associating 802 step remain without compromise.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A parachute system, comprising:
at least one parachute comprising two or more panels and comprising at least one band which is in a lateral direction relative to the two or more panels and is disposed entirely above a skirt band of the at least one parachute wherein the at least one band is secured at different points which are lateral mid-points in individual contiguous ones of the two or more panels, and wherein a first distance between an individual set of points of the different points is shorter than twice a second distance which is a lateral distance from at least one point of the individual set of points to a seam of one panel of the two or more panels having the at least one point.

2. The parachute system of claim 1, further comprising: two or more parachutes of the at least one parachute, the two or more parachutes being part of a cluster to inflate at different rates and to generate different loadings.

3. The parachute system of claim 1, wherein the at least one band comprises different sub-bands, wherein an individual sub-band of the different sub-bands is secured at a first lateral mid-point of a first one of the two or more panels, and wherein the individual sub-band of the different sub-bands is secured at a second lateral mid-point of a second one of the two or more panels which is contiguous to the first one of the two or more panels.

4. The parachute system of claim 3, wherein a further individual sub-band of the different sub-bands is secured at a third lateral mid-point of a third one of the two or more panels which is contiguous to the first one of the two or more panels and which is on an opposite side relative to the second one of the two or more panels, and wherein the further individual sub-band of the different sub-bands is secured at the first lateral mid-point of the first one of the two or more panels.

5. The parachute system of claim 1, wherein the different points are independent of reinforcement stitches or reinforcement points of one or more parachutes.

6. The parachute system of claim 1, wherein the at least one band enables reefed inflation stages for the at least one parachute.

7. The parachute system of claim 1, wherein an inflated version of the at least one parachute is unaffected by distortion based at least in part on a relief action by the at least one band on at least one of the two or more panels.

8. The parachute system of claim 1, wherein the at least one band is secured at the different points which are outside or inside of individual panels of the two or more panels.

9. The parachute system of claim 1, wherein the at least one band passes over or under any reinforcement stitches or reinforcement points of the two or more panels.

10. The parachute system of claim 1, wherein two bands of the at least one band is provided, wherein at least a first of the two bands is located at a first distance which is at a first threshold relative to an apex or vent band of the at least one parachute, wherein at least a second of the two bands is located at a second distance which is at a second threshold relative to the apex or the vent band of the at least one parachute, wherein the first threshold is different than the second threshold.

11. A parachute, comprising:
   at least one band which is in a lateral direction relative to a two or more panels of the parachute and is disposed entirely above a skirt band of the parachute wherein the at least one band is secured at different points which are lateral mid-points in individual contiguous ones of the two or more panels.

12. The parachute of claim 11, wherein a first distance between individual set of points of the different points is shorter than twice a second distance which is a lateral distance from at least one point of the individual set of points to a seam of a panel of the two or more panels having the at least one point.

13. The parachute of claim 11, wherein the different points are independent of reinforcement stitches or reinforcement point of the parachute.

14. The parachute of claim 11, wherein the at least one band is secured at the different points which are outside or inside of the two or more panels, and wherein the at least one band passes over or under any reinforcement stitches or reinforcement points of the two or more panels.

\* \* \* \* \*